US012760760B2

(12) United States Patent
Flaig et al.

(10) Patent No.: US 12,760,760 B2
(45) Date of Patent: Oct. 13, 2026

(54) PAWL NUT WITH SECURING ELEMENT

(71) Applicant: SF HANDELS-UND BESITZGESELLSCHAFT MBH, Aldingen (DE)

(72) Inventors: Hartmut Flaig, Aldingen (DE); Jürgen Müller, Seitingen-Oberflacht (DE)

(73) Assignee: SF HANDELS- UND BESITZGESELLSCHAFT MBH, Aldingen (DE)

( * ) Notice: Subject to any disclaimer, the term of this patent is extended or adjusted under 35 U.S.C. 154(b) by 349 days.

(21) Appl. No.: 18/701,154

(22) PCT Filed: Sep. 22, 2022

(86) PCT No.: PCT/EP2022/076324
§ 371 (c)(1),
(2) Date: Apr. 12, 2024

(87) PCT Pub. No.: WO2023/061716
PCT Pub. Date: Apr. 20, 2023

(65) Prior Publication Data

US 2025/0003445 A1 Jan. 2, 2025

(30) Foreign Application Priority Data

Oct. 15, 2021 (DE) ..................... 20 2021 105 659.2

(51) Int. Cl.
*F16B 39/32* (2006.01)
*F16B 39/22* (2006.01)
*F16B 39/26* (2006.01)

(52) U.S. Cl.
CPC .............. *F16B 39/32* (2013.01); *F16B 39/22* (2013.01); *F16B 39/26* (2013.01)

(58) Field of Classification Search
CPC .......... F16B 39/10; F16B 39/22; F16B 39/26; F16B 39/28; F16B 39/32; F16B 21/283
See application file for complete search history.

(56) References Cited

U.S. PATENT DOCUMENTS 677,212 A * 6/1901 Heilman ................. F16B 39/32
411/328
687,774 A * 12/1901 Oliver ..................... F16B 39/32
411/326

(Continued)

FOREIGN PATENT DOCUMENTS

CN 2646463 Y 10/2004
CN 105257670 A 1/2016

(Continued)

OTHER PUBLICATIONS

International Search Report and Written Opinion dated Jan. 5, 2023 for corresponding application PCT/EP2022/076324.

*Primary Examiner* — Nicholas L Foster
(74) *Attorney, Agent, or Firm* — Bachman & LaPointe, P.C.

(57) ABSTRACT

The invention relates to a pawl nut (10) having a securing element (18) for axially securing a topper element (12) of a shaft (14), in particular a bearing of a gear shaft or a wheel shaft of a Cardan shaft, the pawl nut (10) being screwed on a, in particular frontal, thread-shaft section (16) of the shaft (14) in a tightening direction (D1) in order to axially brace the topper element (12) on the shaft (14) along a screwing axis (S) in the mounted state, the securing element (18) having an engagement section (22) which engages in a recess (24) of the shaft (14) and holds the pawl nut (10) along a loosening direction (D2) in the mounted state. In this context, the pawl nut (10) mounts the securing element (18)

(Continued)

along the screwing axis (S), the pawl nut (10) being twisted on one side along the tightening direction (D1) in relation to the securing element (18).

18 Claims, 5 Drawing Sheets

(56) References Cited

U.S. PATENT DOCUMENTS

| | | | | | |
|---|---|---|---|---|---|
| 712,905 | A * | 11/1902 | Cannon | F16B 39/32 411/197 |
| 1,075,925 | A * | 10/1913 | Maxwell | F16B 39/32 411/953 |
| 1,484,689 | A * | 2/1924 | Walker | F16B 39/32 411/89 |
| 3,454,072 | A | 7/1969 | Dietlein | |
| 4,067,371 | A | 1/1978 | Stencel | |
| 4,824,303 | A | 4/1989 | Dinger | |
| 9,719,550 | B2 * | 8/2017 | Stewart | F16B 39/32 |
| 2016/0084291 | A1 * | 3/2016 | Stewart | F16B 39/32 411/327 |

FOREIGN PATENT DOCUMENTS

| | | | |
|---|---|---|---|
| DE | 2717308 | A1 | 1/1978 |
| DE | 69106939 | T2 | 7/1995 |
| DE | 102010053595 | A1 | 12/2011 |
| WO | 2015132535 | A1 | 9/2015 |

* cited by examiner

PAWL NUT WITH SECURING ELEMENT

BACKGROUND OF THE INVENTION

The present invention relates to a pawl nut having a securing element.

To axially secure topper elements of a shaft, for example a wheel hub having a wheel bearing on a drive shaft joint of a motor vehicle, a caulking nut can be screwed onto the shaft to prevent unintentional loosening of the attached topper element. For this purpose, the shaft has a thread-shaft section, in particular a type of axle journal with an external thread. Known shafts also have radial recesses, particularly in the thread-shaft section. After the caulking nut has been tightened and the topper element has been braced on the shaft, in particular the wheel hub has been braced on the axle journal in a form-fitting and non-rotating manner, the caulking nut itself can be deformed by radial force applied to the recesses of the shaft. Alternatively or additionally, a securing element, in particular a clamping ring, can be used, which secures the caulking nut in the recess by plastic deformation, in particular caulking, in a form-fit and non-rotatable manner in both directions.

A fastening method by means of plastic deformation of the caulking nut or a securing element is comparatively complex and requires a large number of work steps, particularly manual work, and special tools. In addition, the caulking nut can only be loosened with great effort due to the form-fit connection to the shaft, for example for repair and/or replacement purposes. Moreover, plastic deformation and an associated weakening of the material can lead to corrosion problems later on.

Alternatively, a type of cotter pin or locking bolt can be used as a securing element, this cotter pin being inserted into a recess in the shaft in the form of a bore and a radial slot in a castle nut in order to fix the castle nut on the shaft in a screwed-on state. Such a castle nut with cotter pin is known, for example, from DE 69 106 939 T2. The castle nut usually has 6-8 slots having an angular spacing of 45° to 60° in the circumferential direction to secure it. In order to bring such a slot into radial overlap with the recess, in particular the bore, within the shaft, the castle nut may be overtightened or there may be too much axial play in relation to the topper element. An incorrect torque on the castle nut can lead to damage to the shaft itself and/or a topper element, particularly if the shaft is subjected to alternating loads during operation. Installing the cotter pin is also time-consuming and labor-intensive. Furthermore, reuse of a disassembled castle nut cannot be ruled out, which is why there is a potential safety risk if the castle nut itself is damaged.

In particular since the aforementioned securing elements also secure the caulking nut or castle nut along a tightening direction in a form-fit manner in addition to securing it in a loosening direction, the caulking nut or castle nut cannot be readjusted after the fastening process. This can lead to an increase in the axial play to the topper element and potential damage during operation of the shaft, particularly due to a changing load.

DE 10 2010 053 595 A1 shows a pawl nut having a closed retaining ring which forms a first mutual pawl indentation with the pawl nut on an outer side. On an inner side, the retaining ring forms a second mutual pawl indentation with a shaft. The first pawl indentation is sawtooth-shaped, with the indentation flanks of the first pawl indentation being intended to slide against each other in a tightening direction. In this context, it can be assumed that during rotation along the tightening direction, the indentation flanks of the outer indentations of the retaining ring can become deformed and/or worn by being in contact with the indentations of the pawl nut. This wear can influence a fixation against the tightening direction and in particular lead to an unintentional loosening of the pawl nut. Furthermore, the deformation of the indentation flanks can require a considerable amount of force, which prevents simple, particularly manual, assembly. In particular, the production of deformable indentation flanks of the retaining ring, for example in the form of flared sheet metal strips, requires increased manufacturing precision in order to form a non-rotating pawl groove. In addition, deformable indentation flanks have reduced strength, for which reason individual indentation flanks can break off and the pawl nut can become loose, particularly under continuous cyclic loading.

CN 105 257 670 discloses a non-releasable anti-theft screw device having a locking screw, a locking nut and a securing element, a recess being formed in a thread bar of the locking screw and a slot being formed in the locking nut; a group of locking latches being disposed on the interior wall of the slot; the securing element having a fastening end and a resistance end; the securing element being able to inserted loosely in the slot, the securing element facilitating a locking of the screw device in the assembled state.

CN 2 646 463 Y discloses a lockable screw connection having a screw, a nut and a securing element. The screw is equipped with a vertical groove; upper and lower surfaces of the nut are equipped with jagged protrusions at intervals along the circumference; the inner diameter of the securing element is equipped with a conical embossing, which engages in the vertical groove of the screw. In the assembled state, the jagged protrusions of the nut jam with the surface of the securing element and facilitate a cost-efficient theft protection.

U.S. Pat. No. 4,824,303 A discloses a locking-wedge device for fastening a printed circuit board. The device comprises an oblong center wedge having inclined surfaces and two end wedges, which abut against opposite inclined surfaces of the center wedge. The two end wedges are connected to each other via a screw which engages in a threaded hole in the removed end wedge. A friction nut is affixed to a part of the removed end of the screw, the part protruding beyond the removed end wedge, and the device is configured such that it has a pair of low-friction abutting surfaces between the nut and the removed end wedge. This ensures that the friction moment exerted on the nut by the end wedge is exceeded by the friction moment exerted on the nut by the screw when removing the screw entirely.

SUMMARY OF THE INVENTION

The object of the present invention is therefore to propose a pawl nut which, while avoiding the problems known from the state of the art, is particularly easy to assemble and manufacture and at the same time ensures a high degree of operational safety.

This object is attained by the features disclosed herein.

Advantageous embodiments are also disclosed herein and/or are the subject matter of the dependent claims.

According to the invention, a pawl nut having a securing element as an axial securing mechanism for a topper element of a shaft is proposed, in particular a bearing of a gear shaft or a wheel bearing of a Cardan shaft, the pawl nut being screwed on a, in particular frontal, thread-shaft section of the shaft in a tightening direction in order to axially brace the topper element on the shaft along a screwing axis in the mounted state, the securing element having an engagement section which engages in a recess of the shaft and holds the pawl nut along a loosening direction in the mounted state, in particular in a form-fitted manner. In this context, the pawl nut mounts the securing element along the screwing axis, the pawl nut being twisted in one direction along the tightening direction in relation to the securing element.

Furthermore, the invention intends that the pawl nut together with the securing element forms pawl indentations, which mutually engage along the loosening direction, in the radial direction and the securing element can be inserted in the pawl nut and its pawl indentations along the screwing axis, the securing element being formed as a securing ring which is open in the circumferential direction and is elastically deformable in such a manner on one side along the tightening direction that the pawl nut is rotatable along the tightening direction in relation to the securing element, in particular in a sliding manner.

Preferably, the securing ring is elastically deformable in the radial direction.

Preferably, the recess in the shaft is formed along the screwing axis, in particular in the form of at least one longitudinal groove, in order to ensure guidance of the engagement section of the securing element while the pawl nut is being screwed on.

The invention has surprisingly recognized that by using a pawl nut with a securing element that can be twisted in one direction, the pawl nut for securing the topper element can be screwed onto the shaft independently and unhindered by the securing element and secures itself in an opposite loosening direction. No further work steps or special tools are required for this self-locking action. Due to the mounting of the securing element, it is adjusted linearly along the screwing axis together with the pawl nut. The pawl nut can therefore be screwed onto the shaft like an ordinary nut in a particularly simple manner, in particular without special tools and preferably by hand. Counter to the tightening direction and along the loosening direction, the pawl nut has a self-locking effect with the securing element, which is fixed in the circumferential direction in the assembled state, for which reason a loosening of the pawl nut is hindered or blocked by a preferably form-fit stop of the engagement element in the recess of the shaft.

In other words, in contrast to known caulking nuts or castle nuts with locking pins, the pawl nut can preferably screw itself in the tightening direction in a self-locking manner in the assembled state and at the same time lock along the loosening direction.

In a preferred embodiment, the pawl nut forms mutually engaging pawl indentations together with the securing element along the loosening direction, at least one of the pawl indentations being elastically deformable in such a manner that the pawl nut can be rotated along the tightening direction in relation to the securing element, in particular in a sliding manner. The elastic deformation of one of the pawl indentations can enable the pawl nut to rotate freely in one direction in the tightening direction, individual indentations of the pawl indentations sliding against each other or jump over each other while the pawl nut is being screwed on. In the opposite loosening direction, the pawl indentations engage with each other and thus prevent an unintentional loosening of the pawl nut and the bracing with the topper element in the assembled state.

Preferably, the pawl indentation and/or the elastically deformable securing element is designed such that the pawl nut can be screwed on manually along the tightening direction, in particular with a torque of approximately 1 Nm to 6 Nm. The pawl indentation is also preferably designed in such a manner that the engagement section acts as a kind of weakest link. In doing so, the pawl nut preferably can only be removed by destructively breaking off the engagement section of the securing element. The torque required for disassembly is particularly preferably between 70 Nm and 90 Nm, preferably 80 Nm. The shape and/or the material of the engagement section is preferably designed in such a manner, in particular having a lower hardness and/or strength, that the shaft is not damaged by the disassembly.

In a preferred embodiment, the pawl indentations of the pawl nut and the pawl indentations of the securing element are formed in a radial direction and the securing element can be inserted into the pawl nut and its pawl indentation along the screwing axis. In other words, the securing element is designed as a type of toothed disk, which preferably engages in an internal toothing of the pawl nut.

A radial pawl indentation is advantageous because in this arrangement, an elastic deformation can advantageously be formed by the securing element itself and not by individual web-shaped indentations. Furthermore, the securing element can move along the screwing axis in a guide section, the radial pawl indentation having a minimum contact pressure in order to prevent a loss of indentations. Movement of the securing element along the screwing axis makes it easier, in particular, to unscrew the pawl nut and engage the engagement section of the securing element in the recess of the shaft. The ability of the securing element to move along the guide section results in self-alignment of the engagement section in relation to the recess of the shaft.

In other words, in a further development, it may preferably be provided that the securing element is movable along the screwing axis in a guide section in order to facilitate engagement of the engagement section in the recess, the radial pawl indentation having a minimum contact pressure in order to prevent loss of indentation.

In a preferred assembly method, the pawl nut is screwed onto the shaft, the securing element along with the pawl nut being rotated around the screwing axis and adjusted along the screwing axis. If the engagement section is not aligned with the recess in the shaft, the engagement section will rest against a front of the shaft when it comes into contact with the shaft. A further rotation of the pawl nut leads to a relative displacement of the securing element with respect to the pawl nut within the guide section until the engagement section engages in the recess of the shaft, in particular as a spring-and-groove connection. Preferably, a length of the guide section is designed such that an engagement section of the securing element rotated by up to 180° relative to the recess can be brought into engagement for self-alignment and without bracing. In other words, the guide section acts as a kind of tolerance range along the screwing axis if the engagement section of the securing element is not aligned from the outset with respect to the recess of the shaft. Advantageously, this guide section enables particularly easy assembly.

In this context, the securing element can preferably be designed as a securing ring, which has a radial pawl indentation, is open in the circumferential direction and is elastically deformable, preferably in the radial direction. The elastically deformable securing ring is preferably designed in such a manner that the minimum pressure of the radial pawl indentation is ensured in the assembled state in order to prevent an indentation loss in the undeformed state. As soon as the pawl nut rotates along the tightening direction relative to the securing element, the pawl indentations slide against each other and deform the securing element in the radial direction and/or in the circumferential direction in such a manner that the pawl nut can essentially rotate unhindered and freely. Preferably, the rigidity of the securing element is such that the elastic deformation and rotation of the pawl nut can be operated manually by an operator. Advantageously, a ratchet-like rotation of the pawl nut in the tightening direction relative to the securing element generates an operating noise, in particular due to sliding and/or skipping pawl indentations, which can indicate to the operator that the pawl nut is functioning correctly and securely. In particular, a ratchet-like operating noise which characterizes a skipping of the pawl indentations indicates correct engagement of the pawl indentations. For example, a lack of minimum radial pressure of the pawl indentations would have an effect on the operating noise and weaken a ratchet-like noise characteristic; whereas a functional securing ring jumps back into an indentation position after an elastic deformation and a sliding of individual indentations, thereby triggering an operating noise.

Particularly preferably, the engagement section is formed to interact with the recess in the shaft in such a manner that a gap is formed between the engagement section and the recess in the radial direction to allow a deformation of the securing element in the radial direction.

In a further preferred embodiment, the engagement section together with the recess forms a spring-and-groove connection in the mounted state of the pawl nut such that the engagement section breaks off when the pawl nut is subjected to increased torque along the loosening direction. The engagement section thus advantageously forms a weakest link, whereby damage to the shaft can be prevented. At the same time, the indentation between the securing element and the pawl nut can be designed to be particularly resistant to rotation, as the pawl nut does not have to be loosened to release it.

Particularly in connection with the aforementioned gap between the engagement section and the recess, a spring-and-groove connection has the advantage that, compared to a pawl indentation, a force transmission continues to exist, in particular via a form-fit. In contrast, a gap between pawl indentations could lead to the risk of the indentation flanks of the pawl indentations damaging each other due to insufficient engagement and also sliding against each other along the loosening direction.

Further preferably, the pawl indentations of the pawl nut and/or the pawl indentations of the securing element have asymmetrical indentation flanks which are aligned in such a manner that first flat indentation flanks abut against each other along the tightening direction, in particular to ensure a one-directional sliding of the pawl nut and an elastic deformation of the securing element, and second steep indentation flanks abutting against each other along the loosening direction in order to interlock the pawl nut with the securing element in one direction.

In particular by the first flat indentation flanks abutting against each other in a tightening direction, the first flat indentation flanks slide against each other, in particular by the securing element becoming elastically deformable in the radial and/or circumferential direction. This results in a kind of ratchet-like movement, the pawl nut acting as a kind of ratchet in one direction along the tightening direction. Along the loosening direction, second indentation flanks which are relatively steep compared to the first indentation flanks are in contact with each other, in particular a transmitting force component acting essentially in the circumferential direction and a force component in the radial direction not being sufficient to deform the securing element. For this reason, the indentations interlock and thus secure the pawl nut against a loosening rotation.

In particular with a radial arrangement of the pawl indentation in conjunction with the above-mentioned asymmetrical indentation flanks, a radial force component on the first flat indentation flank in the tightening direction is greater than a radial force component on the second steep indentation flank in the loosening direction for the same torque. This favors elastic deformation of the securing element in the radial direction due to interaction between the first flat indentation flank and sliding of the first indentation flank along the tightening direction.

Particularly preferably, the first flat indentation flank has a radius of 4 mm to 6 mm, preferably 5 mm, and/or a flank height, in particular of a straight first flat indentation flank, of 0.8 mm to 1.2 mm, preferably 1 mm, in the radial direction and/or in that second steep indentation flank has a radius of 0.4 mm to 0.8 mm, preferably 0.5 mm to 0.75 mm. In particular, the relatively small radius of the second steep indentation flank results in a pawl indentation in the loosening direction, which has a locking effect essentially in the circumferential direction.

Preferably, the first flat indentation flank having the above-mentioned radius can be produced in a milling process. Alternatively or additionally, the first flat indentation flank can preferably also be formed in a straight line, in particular in a straight line within the specified flank height.

It is further preferred that the pawl indentation has indentations in 15° angle sections in the circumferential direction, preferably having a number of indentations between 22 and 26, particularly preferably 24. This number of indentations is particularly preferred for a securing element having an outer diameter of 29 mm to 31 mm. This fine tuning of the number of indentations in particular allows the topper element to be fastened without play or over-tightening along the screwing axis, especially in comparison to castle nuts having a split-pin lock.

Preferably, the pawl indentation in the pawl nut forms sections without indentations, in particular three sections evenly distributed along the circumference, which preferably reduce the total number of indentations by 35% to 40%. By forming sections without indentations, a sliding along the tightening direction can be favored and thus a torque for tightening can be reduced, in particular to enable manual screwing.

Preferably, the pawl nut mounts the securing element in an interior radial slot, the pawl nut having a frontal deforming section, which holds the securing element along the screwing axis in the deformed state, adjacent to the slot. In other words, this forming section forms a stop with the securing element along the screwing axis, so that the securing element is guided along the screwing axis for being screwed onto the shaft.

In a preferred embodiment, the pawl nut additionally mounts, preferably captively, a freely rotatable sliding disk along the screwing axis for abutting against the topper element, in particular in a form-fitted mounting, in order to reduce a friction coefficient between the pawl nut and the topper element in the mounted state. This means that the topper element can be braced on the shaft along the screwing axis without experiencing a force component in the circumferential direction.

In addition, the invention also relates to a shaft having at least one aforementioned pawl nut having a securing element, the at least one pawl nut being screwed onto at least one thread-shaft section of the shaft and the shaft forming at least one recess, in particular in the form a longitudinal groove, along the screwing axis, the securing element engaging into the recess with at least one engagement section, in particular into a spring-and-groove connection, in order to hold the at least one pawl nut on the shaft in the mounted state along a loosening direction and to brace a topper element on the shaft. For the purposes of the invention, a shaft can be understood in particular as a gear shaft or a drive shaft for a wheel bearing. In particular when using several topper elements and a shaft having several thread-shaft sections, several pawl nuts can be used and screwed onto the shaft in order to brace a topper element in each case. To reinforce the securing effect of the pawl nut, two recesses can preferably be disposed in the shaft, the securing element engaging accordingly in the shaft with two engagement sections.

In a preferred manufacturing method of one of the aforementioned embodiments of the pawl nut, a radial slot having an indentation contour is formed in a pawl nut blank along the screwing axis, in particular by means of a stamping process, above an inner thread. Preferably, a frontal deforming section is then formed further above the indentation contour along the screwing axis. Preferably, a centering section is formed along the screwing axis between the inner thread and the pawl indentation in order to center the pawl nut blank with respect to an embossing tool and to guide it along the screwing axis. Further preferably, the centering section has a larger inner diameter than the inner thread in order to form a stop to the inner diameter along the screwing axis.

Additionally or alternatively, the centering section can also form a defined distance between the inner thread and the pawl indentation in order to adapt the pawl nut to a predefined shaft geometry. For example, the recess can be formed at the end of the shaft and a topper element can be disposed at a distance from the recess along the screwing axis, a length of the centering section being formed in such a manner that the pawl nut having an inner thread can be screwed onto the shaft, the topper element can be braced and at the same time the securing element engages in the recess at the end of the shaft.

Preferably, the pawl nut is designed as a round body formed along the screwing axis, which has an attack or engagement outer contour for fastening tools, in particular hexagonal tools, in particular in the area of the inner thread. Preferably, the outer contour in the area of the pawl indentation and the centering section is cylindrical, in particular without a hexagonal geometry, in order to preferably be able to guide a stamping and/or deforming tool on the outer contour.

In a preferred assembly method for the pawl nut, the securing element is inserted into the radial slot within the pawl nut along the screwing axis and the pawl indentations in the pawl nut are brought into engagement with those of the securing element. To axially secure the securing element, the deforming section is deformed radially inwards in a next step, in particular flanged, to form an axial stop with the securing element.

The pawl nut having the securing element can then preferably be screwed onto the shaft, the engagement section of the securing element being brought into an engagement position with the recess in the shaft, in particular a longitudinal groove, by rotating the pawl nut and preferably engaging in a form-fitted manner in the circumferential direction. In particular, by further rotation of the pawl nut along the tightening direction, as already described above, the pawl nut can be screwed on to brace the topper element relative to the stationary securing element, the securing element acting as a self-locking device in a loosening direction for the pawl nut.

BRIEF DESCRIPTION OF THE DRAWINGS

Further advantages and details of the invention can be yielded from the following description of preferred embodiments of the invention and from merely schematic drawings.

Identical elements or elements with the same function are marked with the same reference numbers in the figures.

DETAILED DESCRIPTION

Figure 1A:
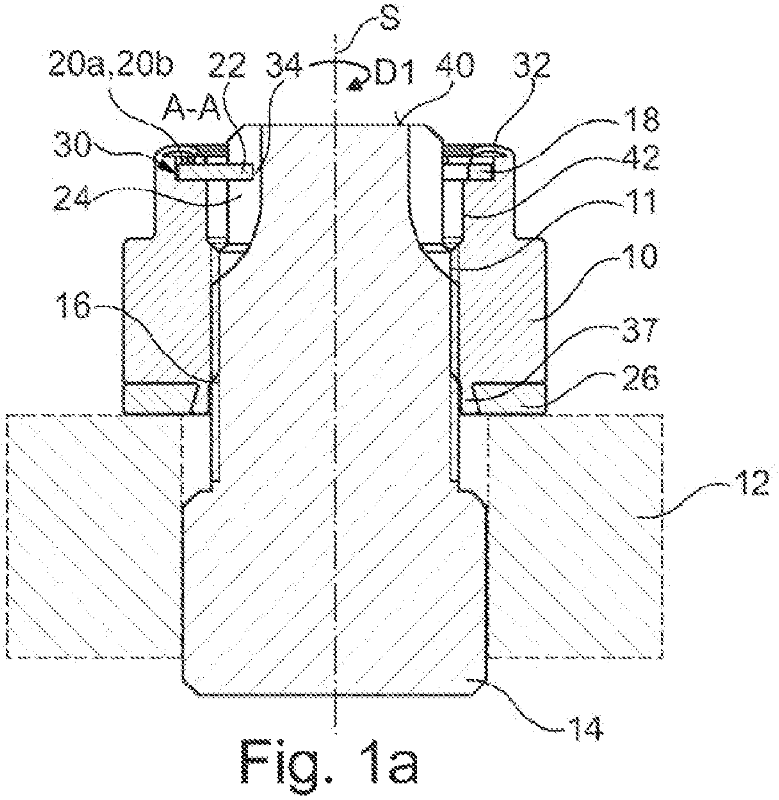
FIG. 1*a* shows a sectional side view of a pawl nut having a securing element in the screwed-on state having a shaft.
Figure 1B:
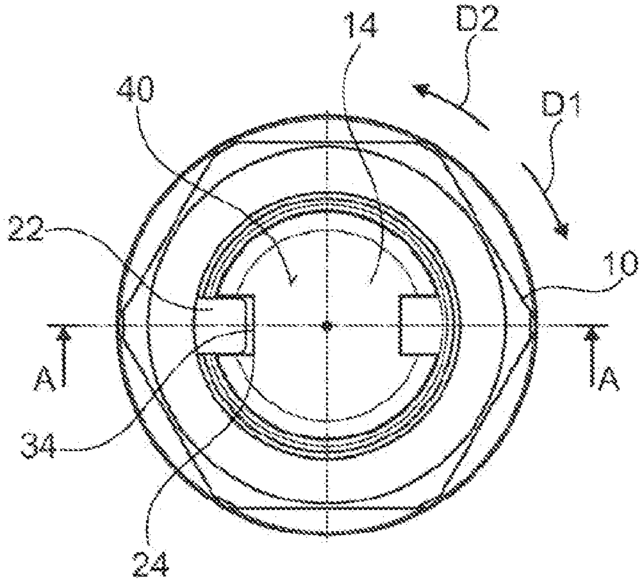
FIG. 1*b* shows a top view of the pawl nut having a shaft as shown in FIG. 1*a,*

FIG. 1*a* and FIG. 1*b* show a pawl nut 10 having a securing element 18 in the assembled state on a shaft 14, in particular an exemplary end section of a drive shaft joint of a motor vehicle. An inner thread section 11 of the pawl nut 10 is screwed onto a thread-shaft section 16 of the shaft 14 in a tightening direction D1 and axially braces a schematically depicted topper element 12, for example a wheel bearing, on the shaft 14 along a screwing axis S. Above the inner thread section 11 of the pawl nut 10, an internal slot 30 is formed, preferably in the radial direction, in which the securing element 18 is mounted along the screwing axis S. The securing element 18 has an engagement section 22 which protrudes in the direction of a recess 24 in the shaft 14 and engages in the recess 24, preferably in a form-fitted manner, in the screwed-on state shown here. In the tightening direction D1, the pawl nut 10 can be rotated on one direction relative to the securing element 18, which engages with the shaft 10. In a loosening direction D2, the engagement section 22 blocks a loosening rotation of the pawl nut 10 by means of a, preferably form-fitted, stop with the recess 24. The pawl nut 10 can therefore lock in a self-locking manner against a loosening rotary movement.

In order to enable the one-directional rotatability, the pawl nut 10 is preferably in an operative connection with the securing element 18 by means of pawl indentations 20*a*, 20*b*, the securing element 18 preferably becoming elastically deformed when rotated in the tightening direction D1 and the pawl indentations 20*a*, 20*b* sliding against each other in a ratchet-like manner.

Figure 2A:
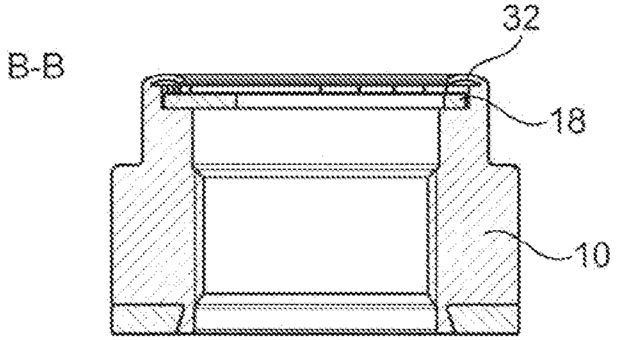
FIG. 2*a* shows sectional view of the pawl nut having a securing element as shown in FIG. 1*a,*
Figure 2B:
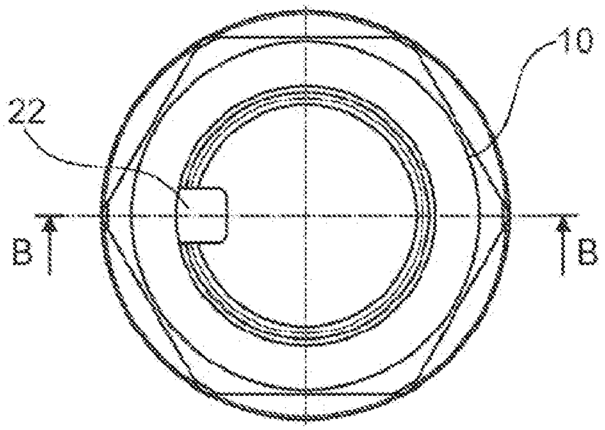
FIG. 2*b* shows a top view of the pawl nut having a securing element as shown in FIG. 1*b*

FIG. 2*a* and FIG. 2*b* again show the pawl nut 10 in the unassembled state, the securing element 18 being mounted in the radial slot 30 by a deforming section 32 along the screwing axis S.

Figure 3:
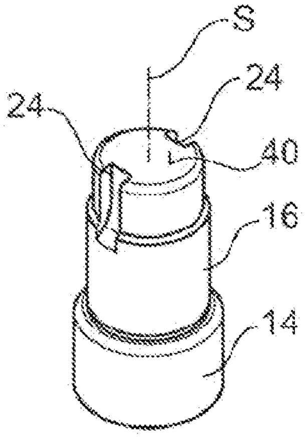
FIG. 3 shows perspective view of the shaft having a thread-shaft section according to FIG. 1*a,*

FIG. 3 shows the shaft 14 and in particular the recesses 24, which is preferably formed as at least one longitudinal groove, in this case two longitudinal grooves, along the screwing axis S. The engagement section 22 of the securing element 18 can engage in the recess 24 as a spring-and-groove connection during an assembly and tightening process of the pawl nut 10 and be guided along the screwing axis S. In doing so, the securing element 18 is held within the slot 30, in particular by the forming section 32. A torque on the pawl nut 10 in the loosening direction D2 can be transmitted to the securing element 18 and thus the shaft 14 in the area of the recess 24 by means of the pawl indentations 20*a*, 20*b* and be secured against loosening. Preferably, the recess 24 is open at the end of the shaft 14 and formed towards a front 40 of the shaft 14, a radial depth of the recess 24 in a transition section, in particular to the thread-shaft section 16 of the shaft, preferably does not decrease in steps, in particular convexly.

Along the screwing axis S, the slot 30 is preferably higher than the thickness t of the securing element 18 in order to form a guide section with limited translation possibility of the securing element 18 along the screwing axis S and a kind of bearing play in relation to the pawl nut 10. This translation possibility allows the engagement section 22 of the securing element 18 to align itself during an assembly step. As soon as a non-aligned engagement section 22 is in contact with a front 40 of the shaft 14 during assembly, the securing element 18 can move within the slot 30 along the screwing axis S until the engagement section 22 overlaps and engages in the recess 24 in the shaft 14 by further rotation of the pawl nut 10. Engagement of the engagement section 22 can be facilitated in particular if the securing element 18 forms a gap to the deforming section 32 at the start of assembly.

In FIG. 4*a* to FIG. 4*d*, the pawl nut 10 is shown as a pawl nut blank having an unmachined forming section 32. To mount the securing element 18 in the slot 30, the securing element 18 is first inserted and then the deforming section 32 is deformed or flanged in order to form a stop as shown in FIG. 1*a* or FIG. 2*a* for the securing element 18 along the screwing axis S.

Figure 4A:
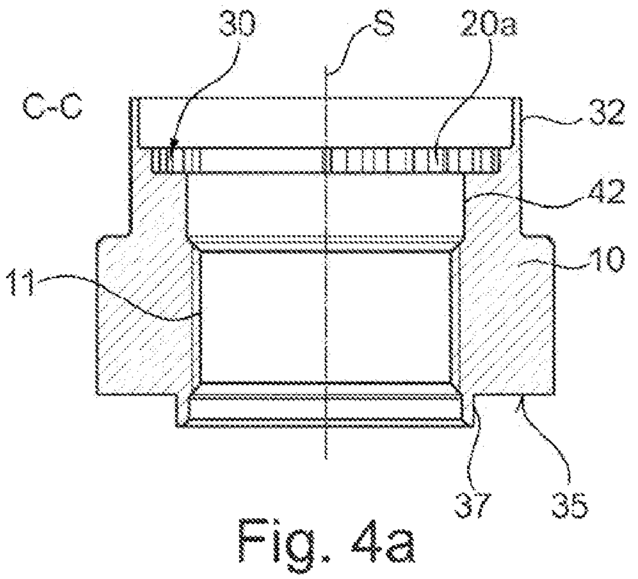
FIG. 4*a* to FIG. 4*d* show views of the pawl nut according to FIG. 1*a* to FIG. 2*b*
Figure 4B:
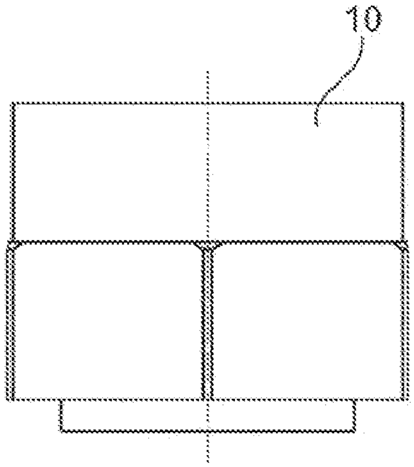
Figure 4C:
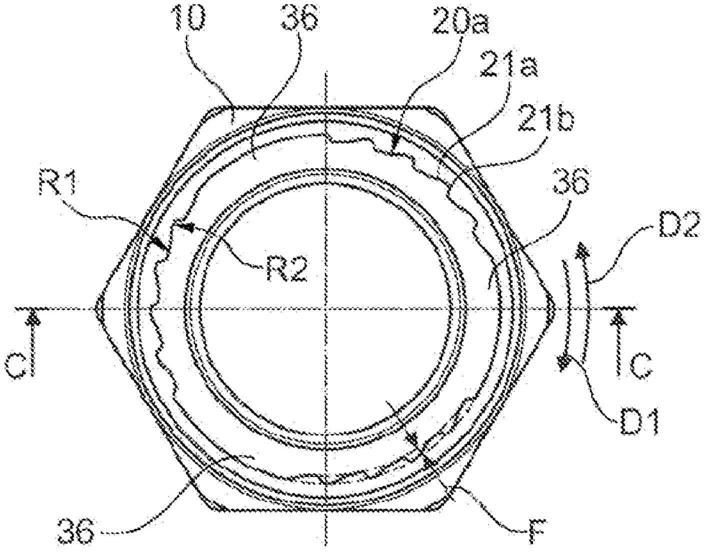
Figure 4D:
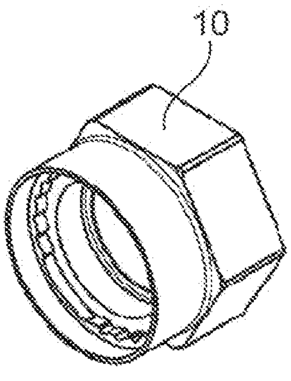

As FIG. 4*b* and FIG. 4*d* show, the pawl nut blank preferably has a cylindrical base body having a hexagonal outer contour for fastening tools. Preferably, the hexagonal outer contour is formed in the area of the inner thread 11. Above the inner thread 11 along the screwing axis S, the outer contour is preferably cylindrical in order to allow embossing and/or forming tools to rest thereon.

In particular, FIG. 4*c* shows that the pawl indentations 20*a* in the pawl groove 10 are preferably formed in the slot 30 in the radial direction and preferably have an asymmetrical indentation contour.

According to FIG. 4*a*, a centering section 42 is preferably formed between the inner thread 11 of the pawl nut 10 and the pawl indentations 20*a* along the screwing axis S in order to set a distance between the pawl indentation 20*a* and the inner thread 11, in particular to enable engagement in a predefined frontal recess 24 of a shaft 14 and/or to guide and center the pawl nut blank in an embossing process of the pawl indentation 20*a* along the screwing axis S relative to an embossing tool. Preferably, the centering section 42 has a larger inner diameter than the inner thread 11, in particular in order to form a stop to the inner thread 11 and to prevent damage to the inner thread 11 during the manufacturing process.

Figure 5A:
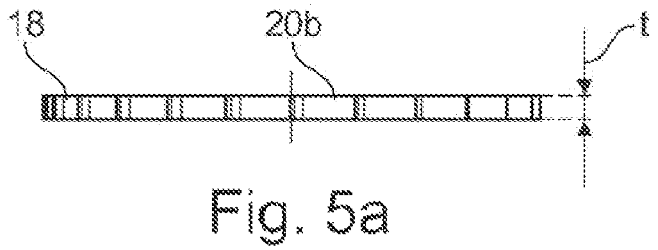
FIG. 5*a* and FIG. 5*b* show side and top views of the securing element as shown in FIG. 1*a,*
Figure 5B:
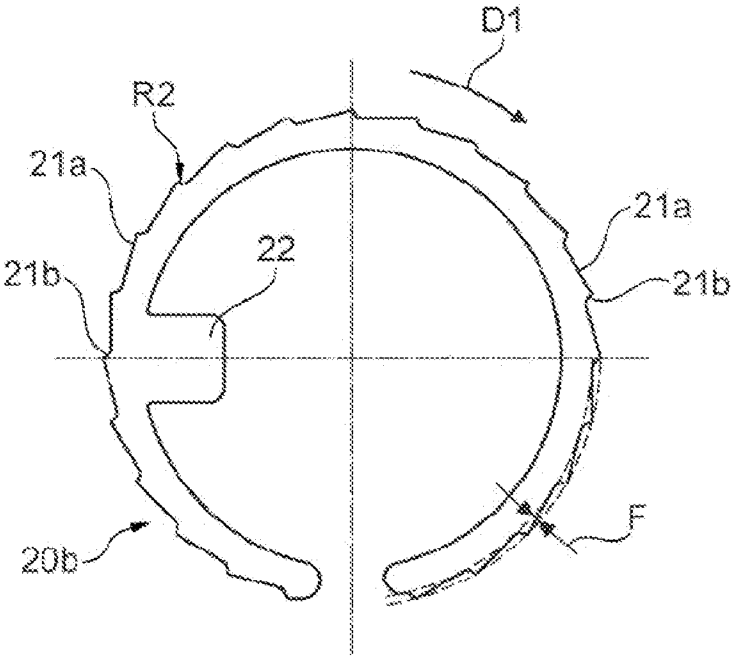

FIG. 5*a* and FIG. 5*b* show the securing element 18 in detail, which is preferably designed as a securing ring open in the circumferential direction and also has radial pawl indentations 20*b* on an outer circumference corresponding to the pawl nut 10, as shown in FIG. 4*c*. In particular, such an open securing ring allows elastic deformation, especially in the radial direction, in order to enable the pawl indentation 20*a*, 20*b* to be loosened in the tightening direction D1 in the deformed state, in particular by sliding off in a ratchet-like manner. So that the securing element 18 designed as a securing ring can also deform elastically in the assembled state, a gap 34 shown in FIG. 1*b* is formed in the assembled state between the engagement section 22 within the recess 24.

Figure 6:
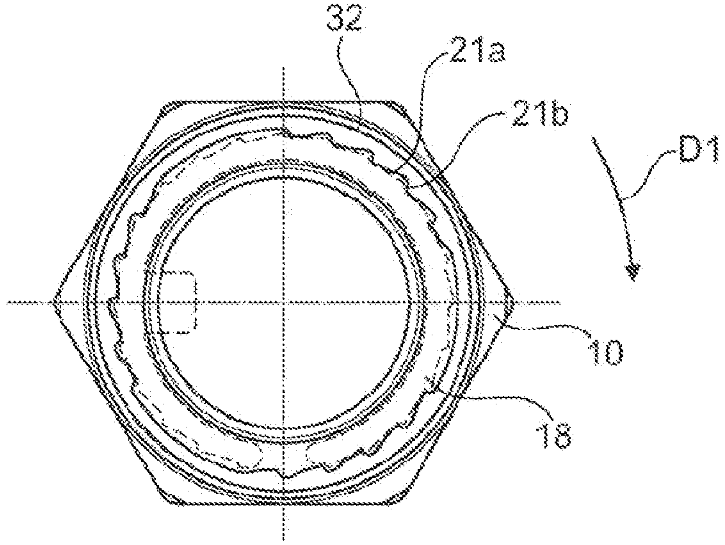
FIG. 6 show a top view of the pawl nut having a securing element as shown in FIG. 4*c* and FIG. 5*b,*

In FIG. 6, the securing element 18 is shown with dashed lines in an inserted state within the pawl nut 10, having an unmachined forming section 32 as shown in FIG. 4*c*, preferably first flat indentation flanks 21*a* abutting each other in the tightening direction D1, here clockwise. In the opposite direction to the tightening direction D1 and in the loosening direction D2, preferably second steep indentation flanks 21*b* abut against each other. Due to the different gradients of the two indentation flanks 21*a*, 21*b*, force components in the radial direction vary in strength depending on the direction of rotation. Along the tightening direction D1, a relatively high radial force component deforms the securing element 18, particularly radially, and allows the pawl nut 10 to slide off in one direction. In the opposite direction, the steep indentation flanks 21*b* are opposed to each other in a form-fitted manner and tilt or lock essentially in the circumferential direction, a radial force component preferably not being large enough to radially deform the securing element 18.

Preferably, first flat indentation flanks 21*a*, in particular of the pawl indentation 20*a* of the pawl nut 10, according to FIG. 4*c*, have a radius R1 of 4 mm to 6 mm, particularly preferably 5 mm, and/or a flank height F in the radial direction of 0.8 mm to 1.2 mm, preferably 1 mm. Preferably, the first flat indentation flank 21*a* of the securing element 18, according to FIG. 5*b*, has a straight, preferably linear gradient within the radial flank height F. The flank height F corresponds to the height of an indentation in the radial direction. A linear gradient, in particular, enables the flat pawl indentations 21*a* to slide particularly smoothly. Further preferably, the second steep indentation flank 21*b* has a radius R2 of 0.4 mm to 0.8 mm, preferably 0.5 mm for the second indentation flank 21*b* of the securing element 18 and 0.75 mm for the second indentation flank 21*b* of the pawl nut 10.

Preferably, indentations are arranged in circumferential directions in 12° to 18°, in particular 15°, angle sections. Further preferably, several sections without indentations 36, in particular three, are disposed within the pawl indentation 20*a* of the pawl nut 10, which preferably reduces the total number of teeth by 35% to 40%. As a result, the engaged indentations can be reduced and a tightening torque can be reduced, and a deformation of the securing element 18 can be facilitated, in particular to enable manual assembly of the pawl nut 10.

The dimensions of the securing element 18, in particular the thickness t shown in FIG. 5*a*, are selected in conjunction with the pawl indentation 20*a*, 20*b* such that when the pawl nut 10 is disassembled, the engagement section 22 breaks off and therefore forms a kind of weakest link. Preferably, the securing element 18 has a thickness t of between 1 mm and 2 mm, particularly preferably 1.5 mm.

FIG. 1*a* and FIG. 7*a* to FIG. 7*c* show a sliding washer 26, which is mounted in the pawl nut 10 along the screwing axis S in a freely rotatable and form-fitted manner for contact with the topper element 12. The sliding washer 26 is used to reduce friction on the shaft 14 while bracing the topper element 12 and thus simplifies screwing on the pawl nut 10.

Figure 7A:
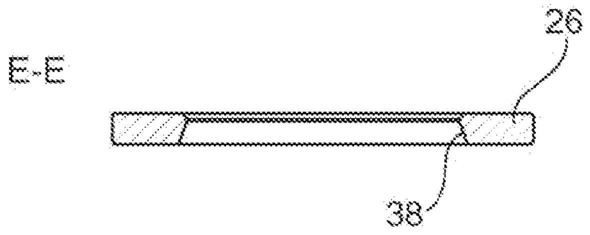
FIG. 7*a* to FIG. 7*c* show views of a sliding washer as shown in FIG. 1*a*.
Figure 7B:
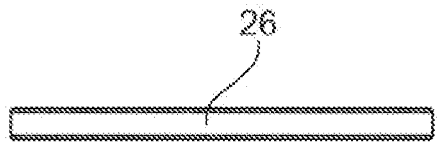
Figure 7C:
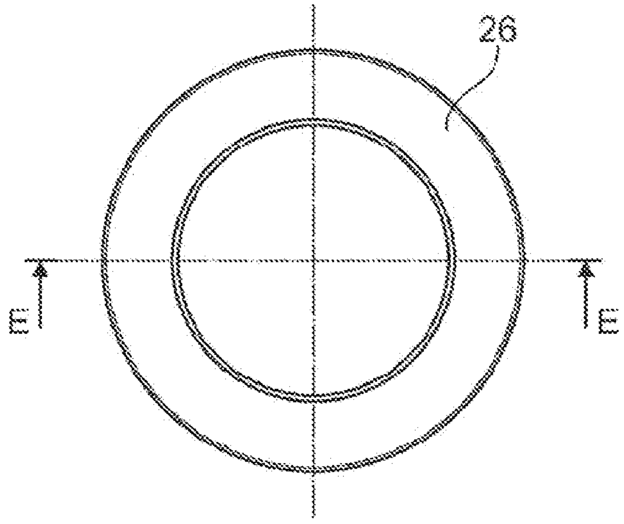

A combined view of FIG. 1*a*, FIG. 4*a* and FIG. 7*a* shows an assembly of the sliding washer 26, the sliding washer 26 being placed on a sliding surface 35 of the pawl nut 10. Subsequently, a sliding deforming section 37, initially formed along the screwing axis S as shown in FIG. 4*a*, is formed onto a preferably conical inner contour 38 of the sliding washer 26, in particular by means of a flanging process. This forms an undercut which, as shown in FIG. 1*a*, rotatably mounts the sliding washer 26 along the screwing axis S.

In a preferred manufacturing method, the pawl indentation 20*a* of the pawl nut 10 is embossed along the screwing axis S as shown in FIG. 4*a* or FIG. 4*c* in order to realize a particularly fast and cost-effective manufacturing method.

The pawl groove 10 described so far can be modified or altered in a variety of manners without deviating from the idea of the invention. For example, it is conceivable that the pawl indentations 20*a* and 20*b* are also formed along the screwing axis S and act on each other. In this case, a one-directional loosening of the indentation 20 could be achieved by elastic deformation of individual indentation flanks 21, whereby play along the screwing axis S would then have to be prevented.

LIST OF REFERENCE SYMBOLS

10 pawl nut
11 inner thread of the pawl nut
12 topper element
14 shaft
16 thread-shaft section
18 securing element
20*a* pawl indentations of the pawl nut
20*b* pawl indentation of the securing element
21*a* first flat indentation flank
21*b* second steep indentation flank
22 engagement section
24 recess of the shaft
26 sliding washer
30 slot in the pawl nut
32 forming section
34 gap between engagement section and recess
35 sliding surface
36 section without indentation of the pawl nut
37 sliding deforming section
38 inner contour of the sliding washer
40 front of the shaft
42 centering section
A, B, C, E sectional views
D1 tightening direction
D2 loosening direction
F flank height
S screwing axis
R1 radius of the first flat indentation flank
R2 radius of the second steep indentation flank
t thickness of the securing element

The invention claimed is:

1. A pawl nut (10) having a securing element (18) as an axial securing mechanism for a topper element (12) of a shaft (14), the pawl nut (10) being screwed on a thread-shaft section (16) of the shaft (14) in a tightening direction (D1) in order to axially brace the topper element (12) on the shaft (14) along a screwing axis (S) in the mounted state, the securing element (18) having an engagement section (22) which engages in a recess (24) of the shaft (14) and holds the pawl nut (10) along a loosening direction (D2) in the mounted state, wherein the pawl nut (10) mounts the securing element (18) along the screwing axis (S), the pawl nut (10) being twisted in one direction along the tightening direction (D1) in relation to the securing element (18), the pawl nut (10) together with securing the element (18) forming pawl indentations (20*a*, 20*b*), which mutually engage along the loosening direction (D2), in the radial direction and the securing element (18) being inserted in the pawl nut (10) and its pawl indentations (20*a*) along the screwing axis (S), wherein the securing element (18) is formed as a securing ring which is open in the circumferential direction and is elastically deformable in such manner in one direction along the tightening direction (D1) that the pawl nut (10) is rotatable along the tightening direction (D1) in relation to the securing element (18).

2. The pawl nut according to claim 1, wherein the engagement section (22) is formed to interact with the recess (24) in the shaft (14) in such a manner that a gap (34) is formed between the engagement section (22) and the recess (24) in the radial direction to allow a deformation of the securing element (18) in the radial direction.

3. The pawl nut according to claim 1, wherein the engagement section (22) together with the recess (24) forms a spring-and-groove connection in the mounted state of the pawl nut (10) such that the engagement section (22) breaks off when the pawl nut (10) is subjected to increased torque along the loosening direction (D2).

4. The pawl nut according to claim 1, wherein the securing element (18) is moveable in a guide section along the screwing direction(S) to alleviate an engagement of the engagement section (22) into the recess (24), the radial pawl indentations (20*a*, 20*b*) having a minimum contact pressure to prevent an indentation loss.

5. The pawl nut according to claim 2, wherein the pawl indentation (20*a*) of the pawl nut (10) and/or the pawl indentation (20*b*) of the securing element (18) have asymmetrical indentation flanks (21*a*, 21*b*) which are aligned in such a manner that first flat indentation flanks (21*a*) abut against each other along the tightening direction (D1), and second steep indentation flanks (21*b*) abutting against each other along the loosening direction (D2) in order to interlock the pawl nut (10) with the securing element (18) in one direction.

6. The pawl nut according to claim 5, wherein the first flat indentation flank (21*a*) has a radius of 4 mm to 6 mm, and/or a flank height (F), of a straight first flat indentation flank (21*a*), of 0.8 mm to 1.2 mm in the radial direction and/or wherein the second steep indentation flank (21*b*) has a radius of 0.4 mm to 0.8 mm.

7. The pawl nut according to claim 2, wherein the pawl indentation (20*a*, 20*b*) has indentations in 15° angle sections in the circumferential direction.

8. The pawl nut according to claim 1, wherein the pawl nut (10) mounts the securing element (18) in an interior radial slot (30), the pawl nut (10) having a frontal deforming section (32), which holds the securing element (18) along the screwing axis (S) in the deformed state, adjacent to the slot (30).

9. The pawl nut according to claim 1, wherein the pawl nut (10) mounts a freely rotatable sliding disk along the screwing axis (S) for abutting against the topper element (12) in order to reduce a friction coefficient between the pawl nut and the topper element (12) in the mounted state.

10. The pawl nut according to claim 1, wherein the shaft is a gear shaft or a wheel bearing of a Cardan shaft, and wherein the pawl nut is screwed on a frontal, thread-shaft section (16) of the shaft (A).

11. The pawl nut according to claim 1, wherein the pawl nut (10) is rotatable along the tightening direction (D1) in relation to the securing element (18) in a sliding manner.

12. The pawl nut according to claim 5, wherein the asymmetrical indentation flanks (21*a*, 21*b*) which are aligned in such a manner that the first flat indentation flanks (21*a*) abut against each other along the tightening direction (D1) to ensure a one-directional sliding of the pawl nut (10) and an elastic deformation of the securing element (18).

13. The pawl nut according to claim 6, wherein the radius is 5 mm, the flank height (F) is 1 mm, and/or the radius of the second steep indentation flank (21*b*) is 0.5 mm to 0.75 mm.

14. The pawl nut according to claim 7, wherein the pawl indentation (20*a*, 20*b*) has between 22 and 26 indentations.

15. The pawl nut according to claim 7, wherein the pawl indentation (20*a*, 20*b*) has 24 indentations.

16. The pawl nut according to claim 9, wherein the pawl nut (10) mounts the freely rotatable sliding disk in a form-filled mounting.

17. A shaft having at least one pawl nut (10) having a securing element (18) according to claim 1, the at least one pawl nut being screwed onto at least one thread-shaft section (16) of the shaft and the shaft forming at least one recess along the screwing axis (S), the securing element engaging into the recess with at least one engagement section in order to hold the at least one pawl nut (10) on the shaft (14) along a loosening direction (D1) and to brace a topper element (12) on the shaft (14).

18. The shaft according to claim 17, wherein the at least one recess is in the form of a longitudinal groove.

* * * * *